July 6, 1926.                    J. DUMOUCHEL                    1,591,297
                              FISHERMAN'S TACKLE BOX
                               Filed Nov. 24, 1924            3 Sheets-Sheet 1
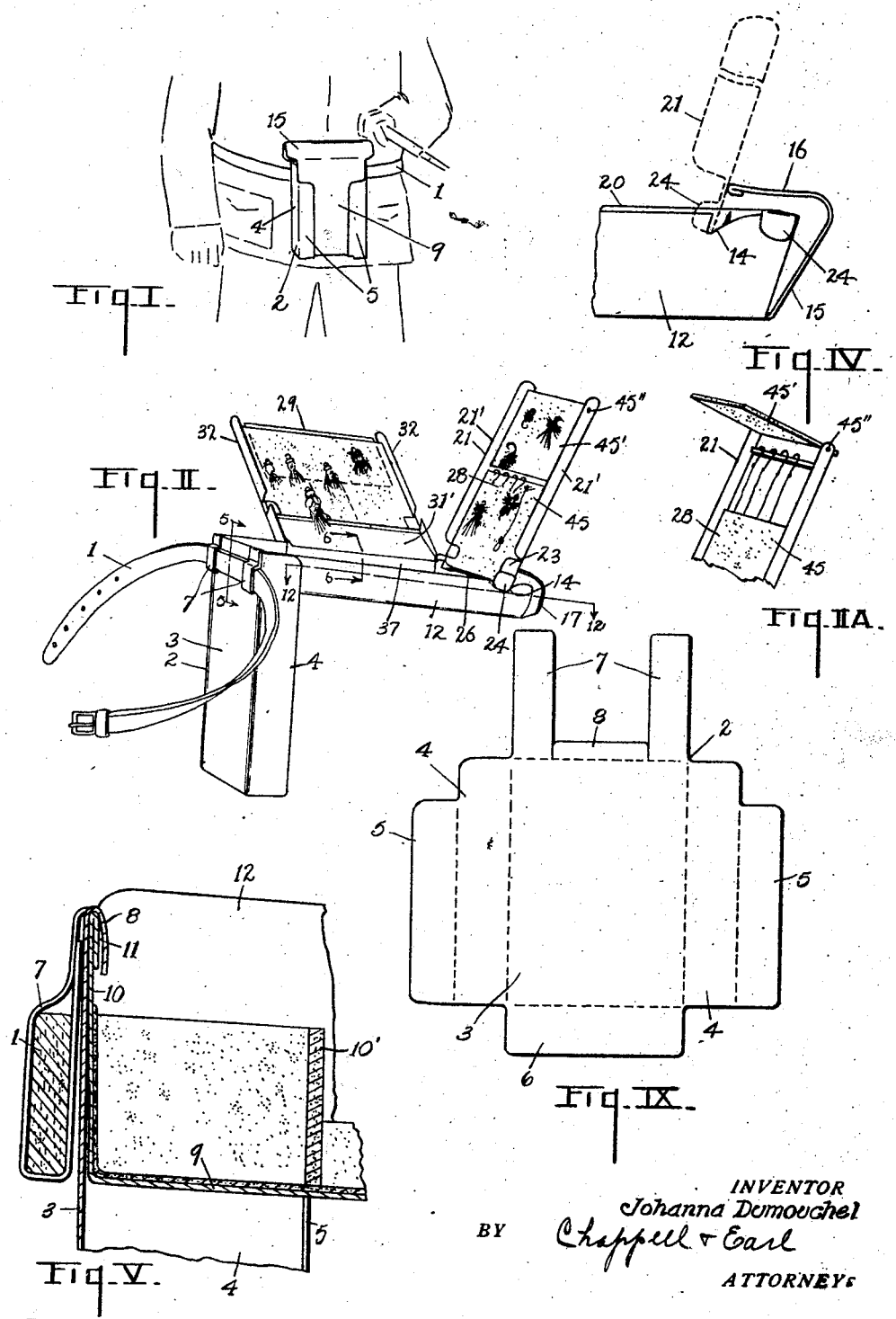
INVENTOR
Johanna Dumouchel
BY Chappell & Earl
ATTORNEYS

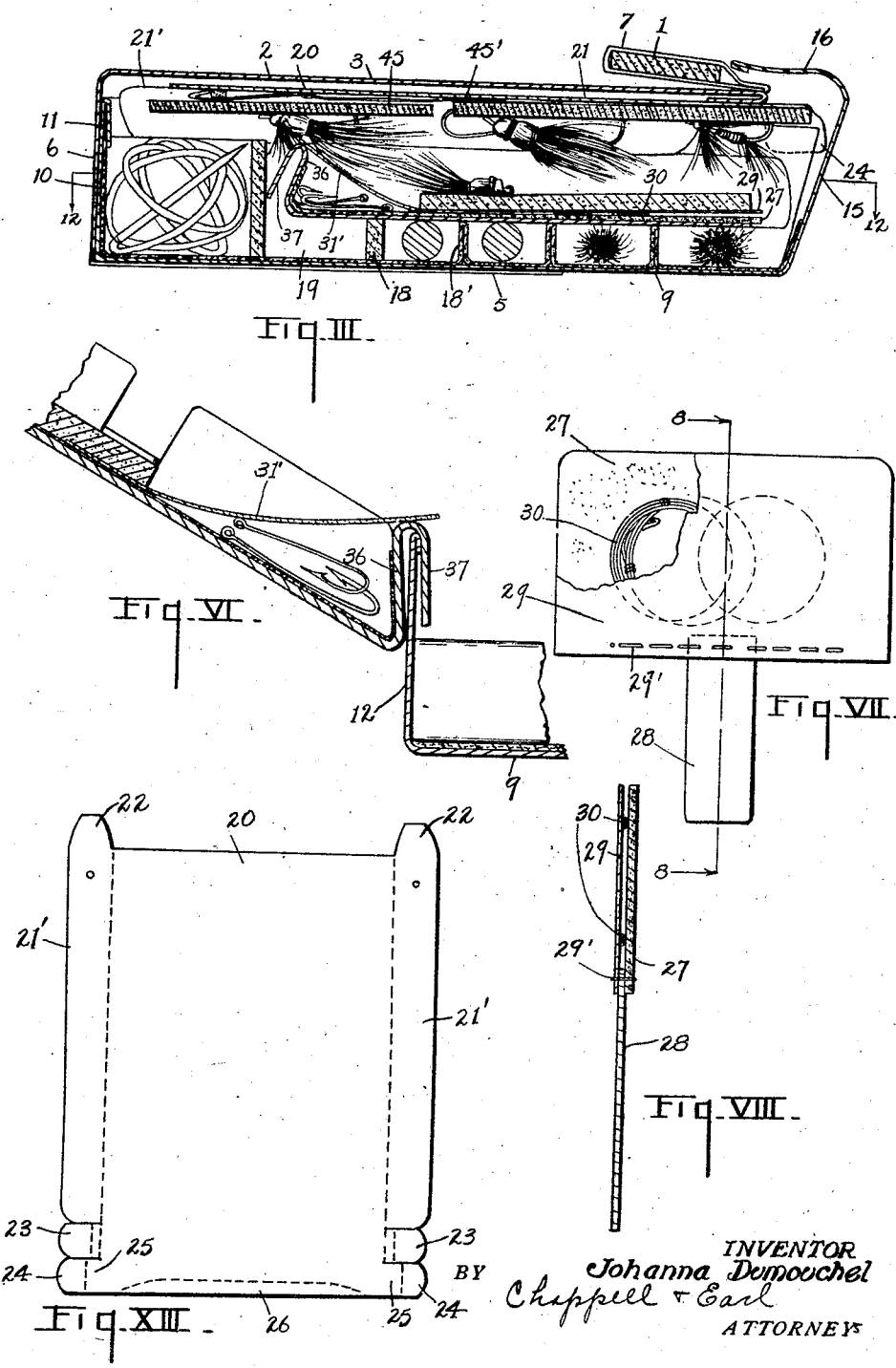

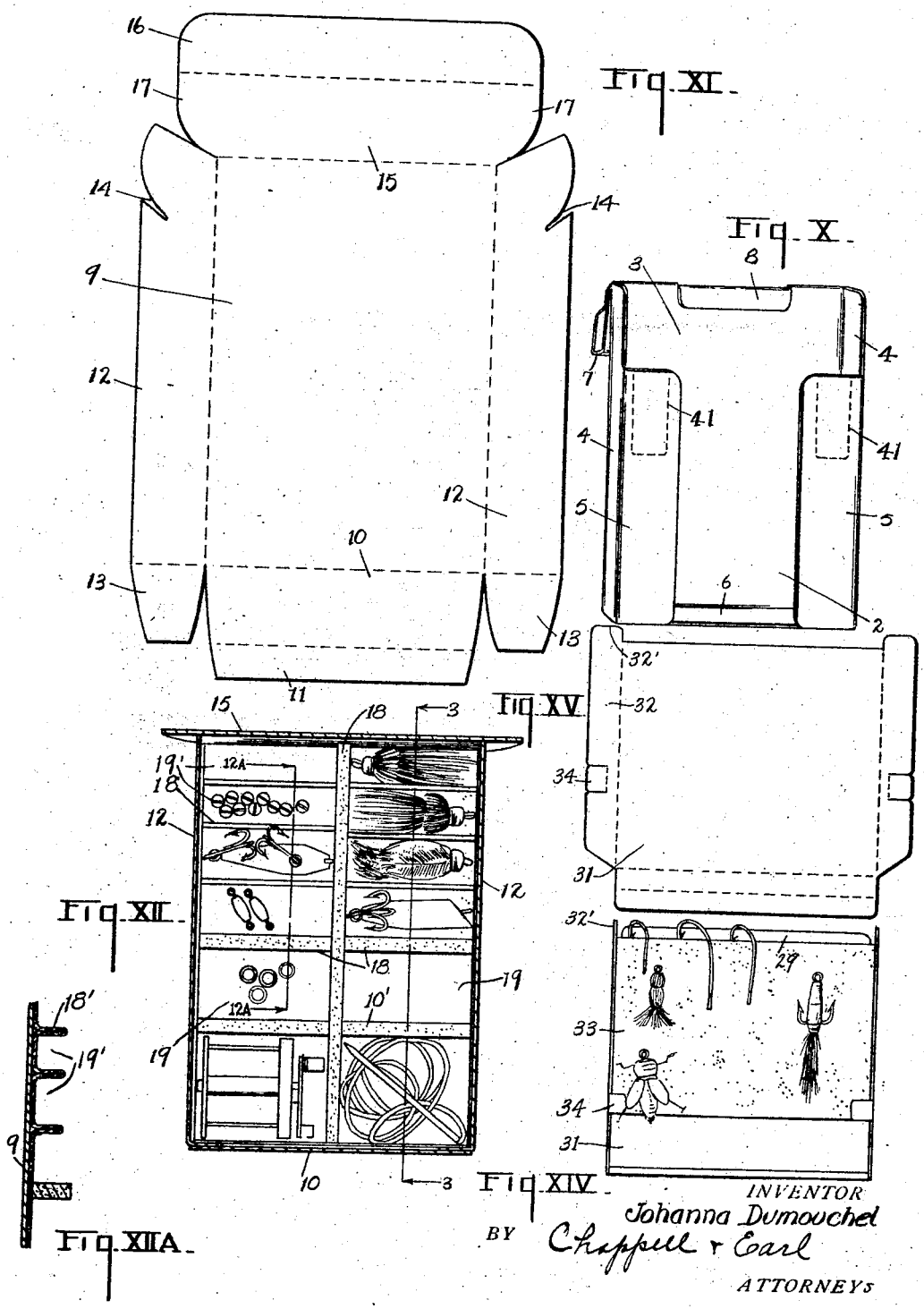

Patented July 6, 1926.

1,591,297

UNITED STATES PATENT OFFICE.

JOHANNA DUMOUCHEL, OF KALAMAZOO, MICHIGAN.

FISHERMAN'S TACKLE BOX.

Application filed November 24, 1924. Serial No. 751,955.

This invention relates to an improved fisherman's tackle box.

The objects of the invention are:

First, to provide a free-hand tackle box with a tray construction which can be worn on the belt or, when of small size, carried in the pocket of a hunting coat, and remaining in open position on the belt when in use, leaving both hands free for changing flies, baits, etc.

Second, to provide such a structure which can be readily constructed of sheet metal by formation from suitable blanks by folding, without soldering, yet waterproof.

Third, to provide such a structure with an improved support for an auxiliary tray or trays in connection with a main tray.

Fourth, to provide in such a structure an improved arrangement and disposition of holder for hooks with snells.

Fifth, to provide such a structure which is very readily spread out for use, very compact, and in protected position when folded or unfolded and carried on the belt or in the pocket of a coat.

Sixth, to provide an improved tray with flexible transparent cover.

Objects pertaining to details and economies of the invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I illustrates the structure in position on the belt of the user, the box being closed.

Fig. II is a side perspective view, somewhat enlarged, showing the box and trays in position for use, when fishing, on the carrying belt.

Fig. II$^A$ is a detail perspective view of the upper part of the auxiliary tray 21, showing the hinged false bottom pad opened to uncover the snell hook tray.

Fig. III is an enlarged vertical longitudinal section view on line 3—3 of Fig. XII.

Fig. IV is an enlarged detail side elevational view from the right side of the outer end of the main tray when in open position, with the auxiliary tray in folded position, the extended open position of the auxiliary tray being indicated by dotted lines.

Fig. V is an enlarged detail sectional view taken on line 5—5 of Fig. II, showing the disposition and method of formation of the belt loop and showing the manner of engagement of the inner end of the main tray with the hook on the main case when open and in extended position.

Fig. VI is an enlarged detail sectional view taken on line 6—6 of Fig. II, showing the manner of carrying the side tray and of supporting the carrying board and the detail of the transparent cover for the hook compartment.

Fig. VII is an enlarged detail plan view of the leader carrying book with felt moistening pad and transparent celluloid cover, and its supporting shank.

Fig. VIII is a detail sectional view of the leader carrying book taken on line 8—8 of Fig. VII.

Fig. IX is a detail view, somewhat reduced, of the blank from which the main casing is formed, dotted to show the folding lines.

Fig. X is a detail view of the main casing in reduced size, dotted lines indicating the position of tongues to engage over the edge of a pocket when the structure is made pocket size.

Fig. XI is a detail view of the blank from which the main tray is formed, dotted to show the folding lines.

Fig. XII is a sectional view of the main tray taken on line 12—12 of Figs. II and III.

Fig. XII$^A$ is an enlarged detail sectional view taken on line 12$^a$—12$^a$ of Fig. XII, showing the form of the flexible tray partitions.

Fig. XIII is a detail view, somewhat reduced, of the blank from which the auxiliary end tray is formed, dotted to show the folding lines.

Fig. XIV is a detail plan view of the auxiliary side tray, with hook pad and compartment, and moistening leader pad.

Fig. XV is a detail view of the blank from which the auxiliary side tray is formed, dotted to show the folding lines.

In the drawing the sectional views are taken looking in the direction of the little arrows at the ends of the section lines and similar numerals of reference refer to similar parts throughout the several views.

The parts of the drawing will be considered by their numbers. 1 is the waist belt of the user. 2 is the main casing made up of a back 3 and sides 4, 4 with front flanges 5, 5 for guiding and engaging the main tray when in folded and closed position. 6 is the bottom end of the main case. 7, 7 are the loops for engaging the belt 1. 8 is a hooked flange turned inwardly and downwardly at the upper back side of the main case for engaging the upper edge of the rear end and retaining the main tray in position.

The main tray is made up of a bottom 9 (Fig. XI) which forms the front of the case when the structure is in folded and closed position (Fig. I). This is provided with a bottom end 10 having a reinforced edge 11 formed by folding the metal on itself, the same engaging under the hooked portion 8 when swung to the front or open position (Figs. II and V). A partition 10' across the main tray separates compartments for the reel and sinkers.

The sides 12 are folded to right angle position and have extensions 13, 13 which are engaged and securely held by the reinforcement flange 11 which strengthens the corners of this main tray. Toward the front the sides 12 are notched at 14, 14, near the top or outer end when in extended position, to engage and carry the auxiliary end tray 21. The top 15 (see right of Fig. III) is folded and has a front downwardly-inclined portion 16 and the ends are extended at 17, 17, so that it affords an effective water shedding eave or top for the entire structure when in folded position. This protects the contents which are thus fully encased.

When in use the main tray is withdrawn from the case and its reinforced bottom end hooked into the position indicated in Figs. II and V, with the folded over edge 11 engaging under the hooked portion 8. The inturned flanges 5 then afford support for the same so that the weight of the tray locks it effectively in position and the tray is thus supported in a slightly inclined position in front of the wearer. Within the main tray are disposed cork partitions 18 forming compartments 19 for hooks, sinkers and other paraphernalia. Small compartments 19' are provided with flexible division walls 18' formed of folded oil cloth (Fig. XII$^A$).

The inner end of the auxiliary tray 21 swings upwardly and outwardly and its upper outer end drops into and engages the notches 14 and resting on eave at 16 is effectively supported in the position indicated in Figs. II and IV. The end ears 24 project outwardly and embrace and engage the opposite side walls of the main tray.

This auxiliary tray 21 is formed from the blank indicated in Fig. XI. The tray has a bottom 20 with upturned side flanges 21' 21' and is provided with a thin cork plate 28. This is retained effectively in position. The sides 21' extend and form stop lugs 22 to support the tray above the bottom end of the case when closed. A cork bottom pad 45 is retained in position by lateral ears 23 23 of the tray, which are folded and clamped over the upper end of the same in close engaging relation, as appears in the perspective view of Fig. II.

The ears 24 24 on extensions 25 25 are folded into right angle position at points outside the line of the fold of the sides 21' 21' and engage over and outside the upper edges of the side flanges 12 12 of the main tray. Thus, when the tray is swung upwardly and outwardly to the position seen in Fig. II the edge of the lower end of the tray will engage in the notches 14 and rest against the flange 16 of the top cover and thus be supported in position to make the contents conveniently accessible. The tray bottom 20 is stiffened by the upturned edge 26.

Above the bottom pad 45, which is held in spaced relation to the bottom 20, is a pivoted false bottom 45' pivoted at 45'' between the extensions 22 and capable of swinging upward to the position indicated in Fig. II$^A$, exposing a snell hook carrying compartment, the space back of the pad 45 forming a convenient receptacle for the snells that are hooked on a cross bar above.

The auxiliary side tray 31 is stored within the main tray beneath the auxiliary end tray. This tray is attached by the loop hooked flange 36, 37, which engages over the side 12 of the main tray (see Figs. II and VI for details). It is formed with sides 32 having extensions 32'. A hook pad 33 is retained by ears 34 at its bottom edge. The upper outer edge is left free to afford a space for the leader pad. Back of this hook pad 33, which is preferably of cork, is the book for leaders 27, having a shank 28 and a front transparent celluloid cover 29 and felt moistening pad 29', the whole being retained together by the stitching 29''. The leaders 30 are disposed and retained in position beneath the transparent celluloid cover and in contact with the felt moistening pad. The shank 28 extends down back of the cork pad 33, as is clearly seen in dotted lines in Figs. II and XIV. At the end of the pad 33 a hook compartment is formed over which I dispose a flexible transparent cover 31', detailed particularly in Figs. III and VI. The contents of this compartment are in sight, yet retained in position and easily accessible by simply flexing the sides of the celluloid cover.

In place of the belt loop 7 on the small size structure, tongues 41, indicated by dotted lines in Fig. X, may be provided and the device may be carried in the pocket of a hunting coat. The tongues 41 support the structure in elevated position above the pocket.

I have shown my improved structure with a series of trays thus supported, but it is clear that it would be an advantageous structure and desirable with only the main tray for use. With the auxiliary trays it is very complete and puts all hooks, sinkers and other tackle within easy reach of the user so that he can change hooks and adapt himself to the situation as desired. The structure can, of course, be made of large size and laid on the seat of a boat for bait casting. It will be seen that when the structure is assembled the various trays fold over each other and act as successive covers, making tight compartments so that all the tackle within any compartment or in any position is effectively retained and waterproof.

Having thus described my invention, what I claim as new and desire to secure by Letters Patent, is:

1. A fisherman's box structure comprising a rectangular open top main casing with back, side walls, front flanges, suitable bottom, and with an inwardly downwardly turned hook portion at the top of the back wall, formed of sheet metal, the front flanges being cut away at their tops to form tray stop rests, a main tray formed of sheet metal, the tray bottom forming the front of the closed box, with the lower tray end adapted when swung into open position to engage under the said hook portion of the main case and rest on said tray stop rests, the upper end of the tray being formed with an integral extension flange cover for the structure, and the sides being notched near the outer end to engage the bottom edge of an auxiliary end tray when in extended horizontal position, and an auxiliary end tray of sheet metal conformed to fold upon said main tray with laterally extending ears at the top end to engage over the side walls of the main tray, and with the upper end edge adapted to project into and engage the said notches in the sides of the main tray when the lower end is turned up and out to open the same, all coacting as described.

2. A fisherman's box structure comprising a rectangular open top main casing with back, side walls, front flanges, suitable bottom, and with an inwardly downwardly turned hook portion at the top of the back wall, formed of sheet metal, the front flanges being cut away at their tops to form tray stop rests, and a main tray formed of sheet metal, the tray bottom forming the front of the closed box, with the lower tray end adapted when swung into open position to engage under the said hook portion of the main case and rest on said tray stop rests, the upper end of the tray being formed with an integral extension flange cover for the structure, coacting as described.

3. A fisherman's box structure comprising a rectangular open top main casing with back, side walls, front flanges, suitable bottom, and with an inwardly downwardly turned hook portion at the top of the back wall, formed of sheet metal, the front flanges being cut away at their tops to form tray stop rests, and a main tray formed of sheet metal, the tray bottom forming the front of the closed box, with the lower tray end adapted when swung into open position to engage under the said hook portion of the main case and rest on said tray stop rests, coacting as described.

4. A fisherman's box structure comprising a rectangular open top main casing with back, side walls, front flanges, suitable bottom, and with an inwardly downwardly turned hook portion at the top of the back wall, formed of sheet metal, a main tray formed of sheet metal, the tray bottom forming the front of the closed box, with the lower tray end adapted when swung into open position to engage under the said hook portion of the main case, and stop means for the tray, coacting as described.

5. In a fisherman's box structure, the combination of a main casing adapted to receive and store the tray structures, a main tray adapted to be disposed within the casing and means for detachably supporting it in open position, the sides of the tray being notched near the outer end to engage the bottom edge of an auxiliary end tray when in extended horizontal position, and an auxiliary end tray of sheet metal conformed to fold upon said main tray with laterally extending ears at the top end to engage over the side walls of the main tray, and with the upper end edge adapted to project into and engage the said notches in the sides of the main tray when the lower end is turned up and out to open the same, as described.

6. In a fisherman's box structure, the combination of a main casing adapted to receive and store the tray structures, a main tray adapted to be disposed within the casing and means for detachably supporting it in open position, an auxiliary end tray of sheet metal conformed to fold upon said main tray, and support means to detachably secure said auxiliary end tray in open position, as described.

7. In a fisherman's box structure, the combination of a main casing, a detachable main tray adapted to be disposed within the casing, an auxiliary tray with cork pad bottom retained therein by suitable means, and a leader book with extending shank adapted to be disposed beneath and within the said cork pad bottom of the auxiliary tray, as described.

8. In a fisherman's box structure, the combination of a main casing, a detachable main tray adapted to be disposed within the casing, an auxiliary end tray, and an auxiliary side tray disposed within the main tray and beneath the auxiliary end tray and enclosed thereby when the box is shut, with hooked end flange for engaging the upper edge of the sides of the main tray and adapted to engage one side of the main tray to support the said side tray in carrying position when open for use, as described.

9. In a fisherman's box structure, the combination of a main casing a detachable main tray adapted to be disposed within the casing, an auxiliary end tray, an auxiliary side tray disposed within the main tray and beneath the auxiliary end tray and enclosed thereby when the box is shut, and means to detachably attach said side tray to the main tray and support it in carrying position when open for use, as described.

In witness whereof I have hereunto set my hand.

JOHANNA DUMOUCHEL.